(12) United States Patent
Downs et al.

(10) Patent No.: US 12,032,863 B2
(45) Date of Patent: Jul. 9, 2024

(54) CREATION OF COMPONENT TEMPLATES AND REMOVAL OF DEAD CONTENT THEREFROM

(71) Applicant: OPEN TEXT CORPORATION, Waterloo (CA)

(72) Inventors: James Matthew Downs, Lexington, KY (US); Billy R. Kidwell, Lexington, KY (US); Anthony Wiley, Lexington, KY (US)

(73) Assignee: OPEN TEXT CORPORATION, Waterloo (CA)

(*) Notice: Subject to any disclaimer, the term of this patent is extended or adjusted under 35 U.S.C. 154(b) by 0 days.

(21) Appl. No.: 18/484,246

(22) Filed: Oct. 10, 2023

(65) Prior Publication Data
US 2024/0036788 A1    Feb. 1, 2024

Related U.S. Application Data

(63) Continuation of application No. 17/354,132, filed on Jun. 22, 2021, now Pat. No. 11,829,667, which is a continuation of application No. 16/723,651, filed on Dec. 20, 2019, now Pat. No. 11,079,987, which is a continuation of application No. 15/780,698, filed as application No. PCT/US2015/063424 on Dec. 2, 2015, now Pat. No. 10,552,107.

(51) Int. Cl.
| | |
|---|---|
| *G06F 3/12* | (2006.01) |
| *G06F 40/131* | (2020.01) |
| *G06F 40/186* | (2020.01) |
| *G06F 40/194* | (2020.01) |
| *G06V 30/24* | (2022.01) |
| *G06V 30/414* | (2022.01) |
| *H04N 1/23* | (2006.01) |

(52) U.S. Cl.
CPC .......... *G06F 3/1257* (2013.01); *G06F 3/1204* (2013.01); *G06F 40/131* (2020.01); *G06F 40/186* (2020.01); *G06F 40/194* (2020.01); *G06V 30/248* (2022.01); *G06V 30/414* (2022.01); *H04N 1/233* (2013.01)

(58) Field of Classification Search
None
See application file for complete search history.

(56) References Cited

U.S. PATENT DOCUMENTS

| | | | | |
|---|---|---|---|---|
| 8,171,158 | B1* | 5/2012 | Grignetti | G06F 16/957 709/238 |
| 2001/0013045 | A1* | 8/2001 | Loschky | G06F 40/103 715/235 |
| 2004/0102958 | A1* | 5/2004 | Anderson, IV | G06F 40/56 704/4 |
| 2010/0306204 | A1* | 12/2010 | Chitiveli | G06F 16/353 707/753 |
| 2014/0033010 | A1* | 1/2014 | Richardt | G06F 40/186 715/222 |
| 2017/0308517 | A1* | 10/2017 | Josifovski | G06Q 10/10 |

* cited by examiner

*Primary Examiner* — Andrew H Lam
(74) *Attorney, Agent, or Firm* — Sprinkle IP Law Group (57) ABSTRACT

In one example of the disclosure, a set of electronic document templates is accessed and instances of duplicated document content are identified. Display of a user notice for first duplicated document content is caused. Responsive to receipt of data indicative of a user instruction to create a component template for the first duplicated content, the component template is created and stored.

21 Claims, 11 Drawing Sheets

CREATION OF COMPONENT TEMPLATES AND REMOVAL OF DEAD CONTENT THEREFROM

CROSS-REFERENCE TO RELATED APPLICATIONS

This application is a continuation of, and claims a benefit of priority under 35 U.S.C. 120 of the filing date of U.S. patent application Ser. No. 17/354,132, filed Jun. 22, 2021, issued as U.S. Pat. No. 11,829,667, entitled "CREATION OF COMPONENT TEMPLATES AND REMOVAL OF DEAD CONTENT THEREFROM," which is a continuation of, and claims a benefit of priority under 35 U.S.C. 120 of the filing date of U.S. patent application Ser. No. 16/723,651, filed Dec. 20, 2019, issued as U.S. Pat. No. 11,079,987, entitled "CREATION OF COMPONENT TEMPLATES AND REMOVAL OF DEAD CONTENT THEREFROM," which is a continuation of, and claims a benefit of priority under 35 U.S.C. 120 of the filing date of U.S. patent application Ser. No. 15/780,698, filed Jun. 13, 2018, issued as U.S. Pat. No. 10,552,107, entitled "CREATION OF COMPONENT TEMPLATES," which is a national stage application of and claims the benefit of priority to International Application No. PCT/US2015/063424, filed Dec. 2, 2015, entitled "CREATION OF COMPONENT TEMPLATES," the entire contents of all are hereby expressly incorporated by reference for all purposes.

BACKGROUND

Multichannel customer communication management (CCM) applications enable a designer user to create customized communication documents for delivery to clients of an enterprise through channels such as web, email, print, and SMS. In this manner the designer user can produce and send account statements, bills, and other documents that are tailored to individual clients. Such personalized, multichannel document communications can enable the enterprise to experience cost savings in the areas of document development and production, while maximizing the impact of its enterprise to client communications.

DETAILED DESCRIPTION

Introduction: Designer users of CCM applications can create rich client communication documents as templates, or compilation of templates, in the style of forms, letters, policies, proposals, memos, or other document types or structures. Designer users for a single enterprise may create thousands of templates. In an example, multiple templates can be created as a source document is localized to many languages and customized for different regions of the world. For instance, an insurance letter sent by an enterprise to a client in New York may have different text or other content differences compared to an insurance letter sent to London due to translation and due to different legal requirements of each geography.

The exponential growth of these templates as design users utilize CCM applications can pose significant challenges to an enterprise, however. The enterprise's documents to be sent to clients typically evolve over time due to changing needs, resulting in multiple versions of templates. When a new letter or other document is needed, a design user will often simply copy an existing template and modify it to suit the new needs. This can result in duplicate content which can become expensive to maintain in terms due to the user resources required to maintain the swelling template library of templates. Such a process can also pose security issues with respect to personal information, as client information may be inadvertently stored as part of old templates. Additionally, as some of the templates may be stored in non-human-readable formats, designer users may have additional difficulties in identifying and working with duplicate templates.

To address these issues, various examples described in more detail below provide a system and a method for creating component templates. In an example, a set of electronic document templates is accessed and instances of duplicated document content are identified. A user notice for first duplicated document content is caused to be displayed. In examples, the duplicated content may be duplicated text, a duplicated image, or a duplicated document structure identified in a first document and a second document of the set of electronic document templates. A component template for the first duplicated content is created and stored responsive to receipt of data indicative of a user instruction to create the component template. The stored template can then be accessed upon by designer users working on new or distinct projects.

In certain examples, the first duplicated content is identical content that is identified in a first document and a second document of the set of electronic document templates. In other examples, the first duplicated content may be content of a first document of the set of electronic document templates that is determined to be within a pre-defined degree of similarity of content of a second document of the set of electronic document templates. In some examples, the component template may be created to include a user-selected version of the first duplicated content that was selected by a user as between the first duplicated content and the second duplicated content.

In certain examples, a plurality of component templates stored in a database that serves as a component template library may be analyzed to identify as dead content in the templates content that was not utilized by a subject application within a specified time period, and the dead content may be deleted from the component templates.

In certain examples, a design rule test may be executed or run upon the created component template and to, responsive to a determination of a violation or failure of the design rule test, a user notice indicative of the violation or failure may be provided.

In certain examples, a performance rule test of incorporation of the created component template into another set of electronic document templates may be executed or run. Responsive to receipt of data indicative that a design rule violation was caused by the incorporation of the component template into the set of templates, a user notice indicative of the design rule violation may be provided. In certain examples in which the created component template is stored in a database, a subject document may be analyzed to identify a set of subject document sections. In certain examples the subject document is a new document that has not been previously analyzed to identify subject document sections. The database may be searched to determine that the first component template in the database is a duplicate to a first section of the subject document. Component templates for the set of identified subject document sections may then be created and stored at the database, except for the first subject document section that was already present in the database.

In this manner, the disclosed examples provide for an efficient and easy to use method and system for creation of component templates. The disclosed examples thus enable easy identification of inefficiencies caused by duplicative document designs, intelligent creation of component templates, and storage of the created templates in template libraries accessible to the designer users during project development. Users of CCM applications and other applications should each appreciate the reduced costs, time savings, and increased document quality to be enjoyed with utilization of the disclosed examples relative to manual creation and maintenance of template libraries.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of creating component templates. The fourth section, labeled "Operation," describes implementation of various examples.

Figure 1:
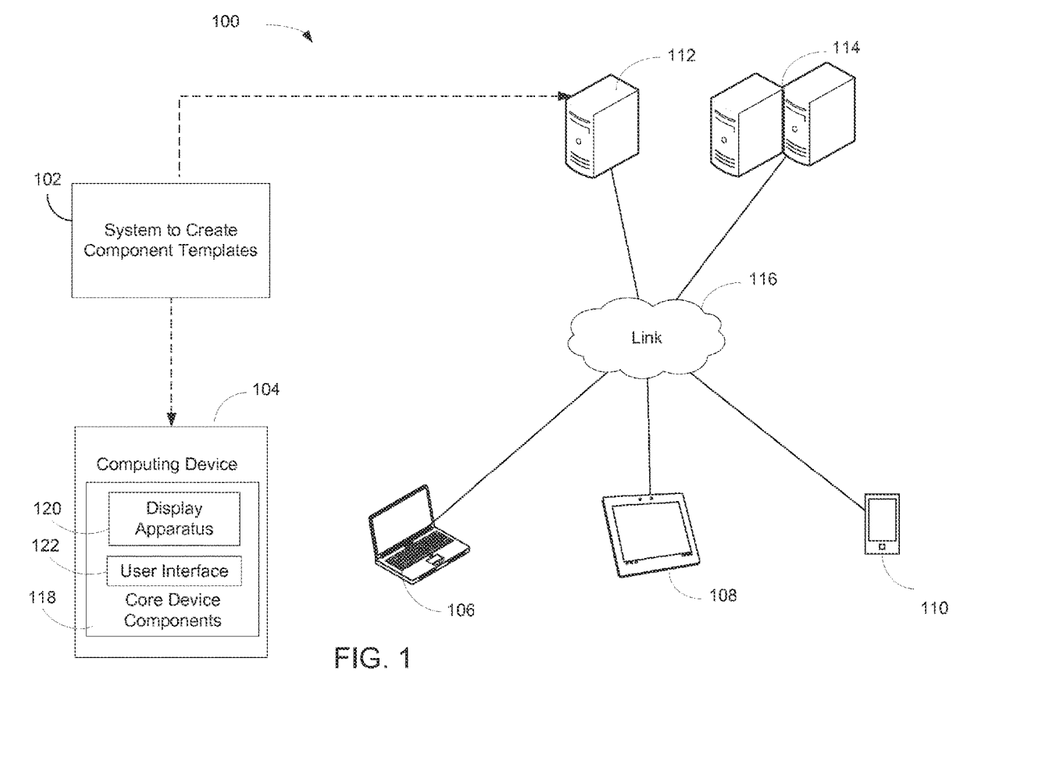
FIG. 1 is a block diagram depicting an example environment in which various examples of the disclosure may be implemented.

Environment: FIG. 1 depicts an example environment 100 in which examples may be implemented as a system 102 for creating component templates. Environment 100 is shown to include computing device 104, client devices 106, 108, and 110, server device 112, and server devices 114. Components 104-114 are interconnected via link 116.

Link 116 represents generally an infrastructure or combination of infrastructures to enable an electronic connection, wireless connection, other connection, or combination thereof, to enable data communication between components 104-114. Such infrastructure or infrastructures may include, but are not limited to, a cable, wireless, fiber optic, or remote connections via telecommunication link, an infrared link, or a radio frequency link. For example, link 116 may represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally a computing device with which a user may interact to communicate with other client devices, server device 112, and/or server devices 114 via link 116. Server device 112 represents generally a computing device to serve a program and corresponding data for consumption by components 104-110 and 114. Server devices 114 represent generally a group of computing devices collectively to serve a program and corresponding data for consumption by components 104-110 and 112.

Computing device 104 represents generally a computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally a combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally a combination of hardware and programming to enable interaction between a user and device 104 such that the user may affect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of displays of electronic documents or images at device 104, and that also may enable a user to operate or control functionality of device 104.

Figure 2:
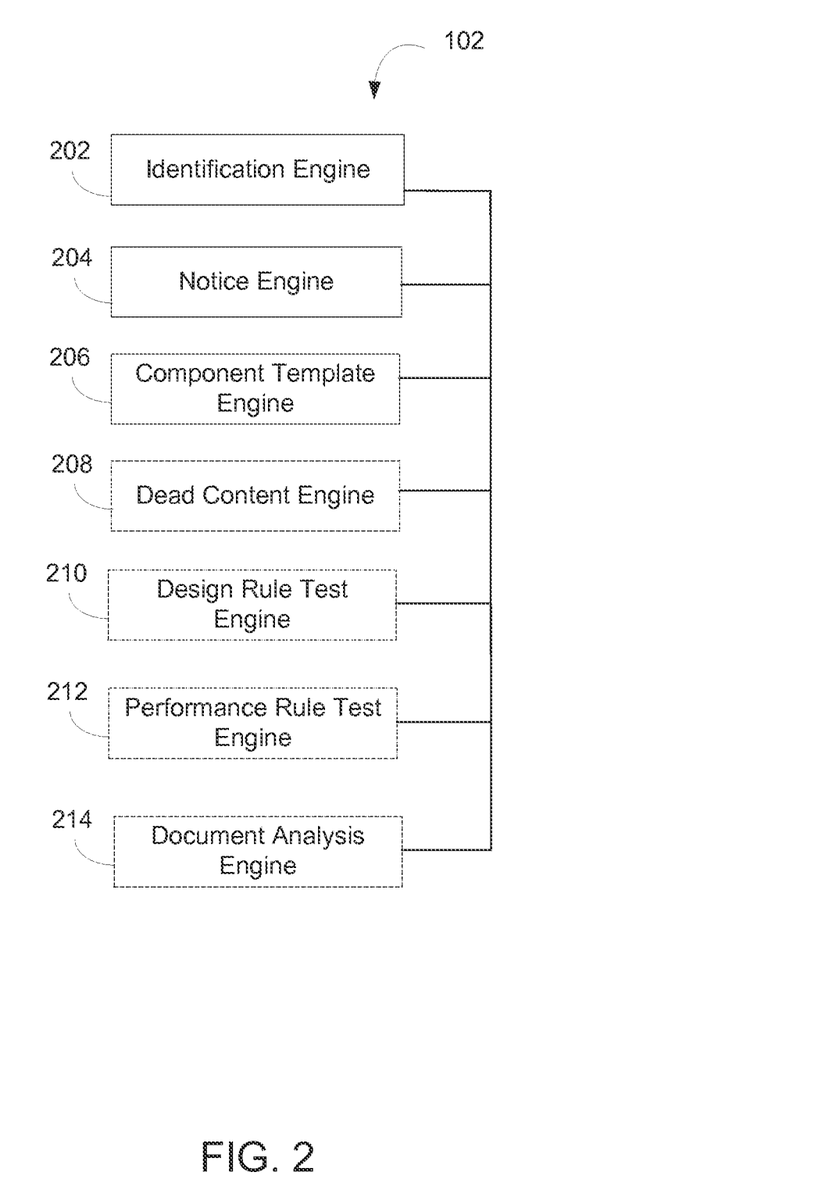
FIG. 2 is a block diagram depicting an example of a system to create component templates.

System 102, discussed in more detail below, generally represents a combination of hardware and programming to create component templates. In some examples, system 102 may be wholly integrated within core device components 118. In other examples, system 102 may be implemented as a component of computing device 104, client devices 106-110, server device 112, or server devices 114 where it may take action based in part on data received from core device components 118 via link 116. In other examples, system 102 may be distributed across computing device 104, client devices 106-110, server device 112, or server devices 114. In an example, components that implement functionality of identification engine 202, notice engine 204, and component template engine 206 may be included within computing device 104, wherein components that implement functionality of dead content engine 208, design rule test engine 210, performance rule test engine 212, and document analysis engine 214 may be components included within a server device 112. Other distributions of system 102 across computing device 104, client devices 106-110, server device 112, and server devices 114 are possible and contemplated by this disclosure.

Figure 3:
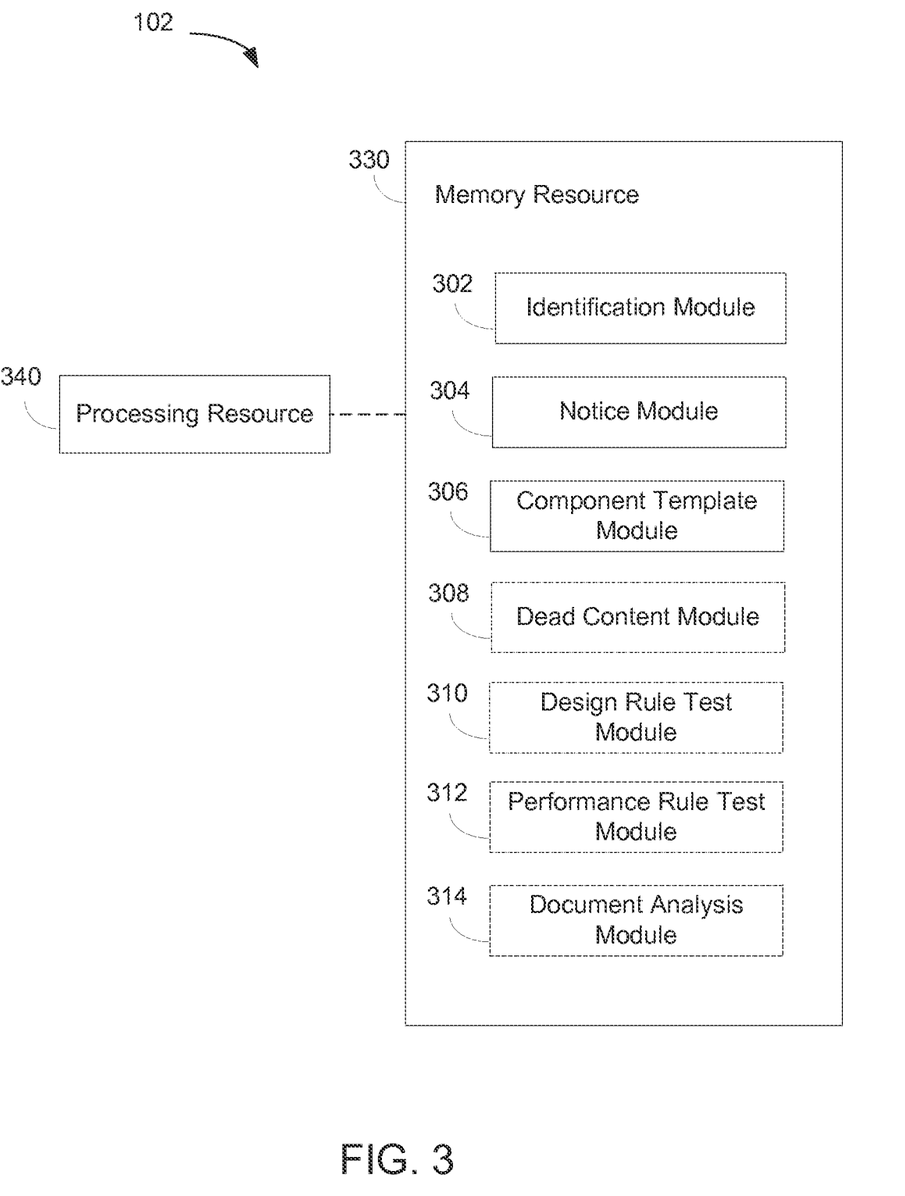
FIG. 3 is a block diagram depicting a memory resource and a processing resource to implement examples of a system to create component templates.

Components: FIGS. 2 and 3 depict examples of physical and logical components for implementing various examples. In FIG. 2 various components are identified as engines 202, 204, 206, 208, 210, 212 and 214. In describing engines 202-214 focus is on each engine's designated function. However, the term engine, as used herein, refers generally to a combination of hardware and programming to perform a designated function. As is illustrated later with respect to FIG. 3, the hardware of each engine, for example, may include one or both of a processor and a memory, while the programming may be code stored on that memory and executable by the processor to perform the designated function.

FIG. 2 is a block diagram depicting components of a system 102 to enable creation of component templates. In this example, system 102 includes identification engine 202, notice engine 204, component template engine 206, dead content engine 208, design rule test engine 210, performance rule test engine 212, and document analysis engine 214. In performing their respective functions, engines 202-214 may access a data repository, e.g., a memory accessible to system 102 that can be used to store and retrieve data.

In an example, identification engine 202 represents generally a combination of hardware and programming to access a set of electronic document templates and identify instances of duplicated document content. In examples, identification engine 202 may access the set of electronic data templates via a network, e.g., link 116 (FIG. 1). As used herein, a "document" refers generally to a collection of data that provides information or evidence, or that serves as a record. A document may be in electronic or hard copy form. An "electronic document" refers generally to a document in an electronic or soft copy format such that that can be interpreted by a computer or other electronic device to display, interpret, and process data included within the document. In examples an electronic document may be a document generated by a software and stored on magnetic media (disks) or optical media (CDs, DVDs). In other examples an electronic document may be a document transmitted by electronic means, e.g., by electronic mail or by electronic data interchange (EDI). A "hard copy" of a document refers generally to a printed version or copy of the document, including but not limited to a version or copy printed upon paper.

As used herein, a "document template" refers generally to a preset format, pattern, or model for a document, to be used so that the document does not have to be recreated each time it is needed. As used herein, an "electronic document template" refers generally to a document template for an electronic document. As used herein, document "content" refers generally to an element of a document that is displayable. In an example, content of an electronic document or component may be displayed at a display device as or after a web page, e.g., a web page from a website, is interpreted by a web browser. Content for an electronic document or component may be or include, but is not limited to, text, images, document structure, audio, and video. In another example, content of a hard copy document or hard copy component may be or include, but is not limited to, printed text, images, and document structure.

Continuing at FIG. 2, notice engine 204 represents generally a combination of hardware and programming to cause display of a user notice for first duplicated document content that was identified by identification engine 202. In examples, notice engine 204 may send data to a computing device via a network, e.g., via link 116 (FIG. 1), to cause display of the user notice. As used herein, a "user notice" refers generally to a message that is displayed to inform a user. As used herein, "display" refers generally to exhibition or presentation caused by a computer for the purpose of perception by a user via an electronic display component. In examples, a display may be a display to be presented at a computer monitor, touchscreen, projection device, or other electronic display component. As used herein, a "display component" refers generally to a combination of hardware and programming to exhibit or present content, a message, or other information for perception by a user, and can include, but is not limited to, a visual, tactile or auditory display. In examples, the display may include a graphic user interface to enable user interaction with the display.

Component template engine 206 represents generally a combination of hardware and programming to receive data indicative of a user instruction to create a component template for the first duplicated content that was identified by identification engine 202. Component template engine 206, in response receipt of such data, is to create and to store a component template for the first duplicated content. As used herein, a "component" refers generally to a subset of a document. As used herein, a "component template" refers generally to a format, pattern, or model for a component, to be used so that the component does not have to be recreated each time it is needed. In an example, the received data may be indicative of a user instruction that was created or initiated by a user at a same computing device to which notice engine 204 caused display of the user notice that identified the duplicated content. In one example, component template engine 206 may cause the created component template to be stored at a database that is accessible via a network, e.g. via link 116. As used herein, a "database" refers generally to any organized collection of data in digital form such that it can be stored in computer memory or a data storage device. In examples, a database may be a collection of data organized according to files, folders, outline headers or other organizational containers or units. In certain examples, a database may support report, view, table or other query functionality to enable a design user to search for and retrieve created component templates that are stored in the database.

Continuing at FIG. 2, in an example identification engine 202 may identify first duplicated document content that is duplicated text among documents included in the set of electronic document templates. In another example, identification engine 202 may identify first duplicated document content that is a duplicated image included in the set of electronic document templates. As used herein, an "image" refers generally to a rendering of an object, scene, person, or abstraction such as text or a geometric shape. In yet another example, identification engine 202 may identify first duplicated document content that is duplicated document structure among documents included in the set of electronic document templates. As used herein, a "document structure" refers generally to a construction, arrangement, or configuration of structural elements of a document including, but not limited to arrangement of paragraphs and sections of the document.

In an example, identification engine 202 may identify first duplicated document content that is identical content among documents included in the set of electronic document templates. In another example, identification engine 202 may identify first duplicated document content that is duplicated content among documents included in the set of electronic document templates by determining that content (e.g., text, an image, or a document structure) of a first document of the set of electronic document templates is determined to be within a pre-defined degree of similarity of content with respect to a second document of the set of electronic document templates.

In an example in which identification engine 202 identifies first duplicated document content that is duplicated content among documents included in the set of electronic document templates on the basis of a pre-defined degree of similarity, component template engine 206 may identify from the set of duplicated document a comprehensive version of the first duplicated content that includes the greatest number of display elements as among the set of versions of the duplicated content. In different examples, the display elements to be counted to determine the most comprehensive version of the first duplicated content may be or include characters, words, or structural elements (including, but not limited to lines, paragraphs, and sections) of the first duplicate content being analyzed.

In another example in which identification engine 202 identifies first duplicated document content that is duplicated content among documents included in the set of electronic document templates on the basis of a pre-defined degree of similarity, component template engine 206 may create the component template to include a user-selected version of the first duplicated content. For instance, component template engine 206 may present a design user, via a display component, with a set of variations of first duplicated content that are similar enough to be deemed duplicates on the basis of having a pre-defined degree of similarity in each of the variations, and may present the design user with a graphic user interface to enable the user to select a most desirable version among the variations. Continuing with this example, component template engine 206 may receive the user selection of a most desirable version as between the first duplicated content and the second duplicated content, and may then proceed to create the component template to include the version of the first duplicated content that was selected by a user as between the first duplicated content and the second duplicated content.

In certain examples, system 102 may additionally include a dead content engine 208. Dead content engine 208 represents generally a combination of hardware and programming to analyze a set of component templates stored in a component template library to identify as dead content included in content templates and not utilized by a subject application within a specified time period. Dead content engine 208 is to in turn delete the identified dead content from the component templates. In this manner, system 102 after having identified duplicated content and created component templates stored in a component template library, may crop or prune the component template to eliminate the dead content. In a particular example, dead content engine 208 is to cause display of a user alert descriptive of the dead content, and is to delete the dead content from the component templates responsive to receipt of data indicative of a user instruction to delete. In examples, the display may be caused to occur at a computing device that is utilized by a designer user and is in electronic communication with system 102 via a network, e.g., link 116. As used herein, a "designer user" refers generally to a user that utilizes an application, e.g., a CCM application, to designs documents or document templates.

In certain examples, system 102 may additionally include a design rule test engine 210. Design rule test engine 210 represents generally a combination of hardware and programming to execute or run a design rule test upon the component template and to, responsive to a determination of violation or failure of the design rule, cause provision of user notice indicative of the violation or failure. As used herein, a "design rule test" refers generally to a test to identify occurrences of violation or compliance with a design rule that has been established for the tested component template. In examples, the design rule test may test for violation of design rules including, but not limited to, design rules regarding fonts, font styles, colors, font size, font effects, character spacing, line spacing, margins, bullet format, numbered paragraph format, page breaks, headers, footers, page numbers, watermarks, page layout, tables, margins, word counts and/or footnotes. In examples, the design rules utilized in the design rule test may be stored as a document at a memory component accessible to system 102 via a network, e.g., link 116.

In certain examples, system 102 may additionally include a performance rule test engine 212. Performance rule test engine 212 represents generally a combination of hardware and programming to execute or run a performance rule test of incorporation of the created component template into a set of electronic document templates. In an example, the set of electronic document templates may be a test set of document templates. Performance rule test engine 212, responsive to receipt of data indicative of a violation of a design rule that was caused by the incorporation of the created component template into a document of the test set of electronic document templates, causes a user notice indicative of the design rule violation to be provided. In examples, the performance rule test may test for errors that occur or become evident as the created component template is incorporated into another document template or is otherwise put to use. In one example, performance rule testing may occur as a development or sandbox testing step. In other examples, performance rule testing may occur as a step in production use of the template. In an example, the performance rule test may test for violation of design rules relative to size or features of the created component template relative to another template that the created template is to be incorporated into or is to appear with. In another example, the performance rule test may test for violation of white space or spacing rules that occur as the created component template is incorporated into or is to appear with another component template. In other examples, the performance rule test may test for violation of other design rules including, but not limited to, design rules regarding fonts, font styles, colors, font size, font effects, character spacing, line spacing, margins, bullet format, numbered paragraph format, page breaks, headers, footers, page numbers, watermarks, page layout, tables, margins, word counts and/or footnotes. In other examples, the performance rule test may test for violation of design rules regarding application or system speed, RAM usage or other memory usage, display clarity, screen flickers of flashes, color, brightness, document crashes, application crashes, system crashes, document lock-up or freeze, application lock-up or freeze, or system lock-up or freeze. In examples, the design rules utilized in the design rule test may be stored as a document at a memory component accessible to system 102 via a network, e.g., link 116.

Document analysis engine 214 represents generally a combination of hardware and programming to obtain a subject document and to analyze the subject document to identify a set of sections in the subject document ("subject document sections"). In examples, the analyzed subject document may be a new document, e.g., a document that has not been previously analyzed to identify sections or to create component templates. In a particular example, the analyzed subject document may be a hard copy document, with the analysis including an image capture of the hard copy document. Document analysis engine 214 is to in turn search the database of component templates to determine that the first component template stored in the database is a duplicate to a first subject document section. Document analysis engine 214 is to then create and store in the database subject component templates for the set of identified subject document sections, except that document analysis engine 214 does not create and store a subject component template for the first subject document section that is a duplicate to the first component template that was already included in the database. In this manner, document analysis engine 214 is to identify subject document content and is to create and to store component templates for such subject document content, while avoiding duplication of efforts and resources where it is determined content of the subject document is already represented by a component template stored in the database.

In examples, identification engine 202 may access the set of electronic document templates, notice engine 204 may cause display of a user notice for first duplicated document content, and/or component template engine 206 may receive data indicative of a user instruction to create a component template and store the component template over a link 116 via a networking protocols. In other examples, dead content engine 208 may cause display of a user alert, design rule test engine 210 may cause provision of user notice indicative of violation or failure of a design test rule, performance rule test engine 212 may cause provision of a user notice indicative of a design rule violation, and/or document analysis engine 214 may search a database to determine that the first component template is a duplicate to a first subject document section, and store component templates for a set of identified subject document sections except for the first subject document section over a link 116 via a networking protocol. In examples the networking protocol may include, but is not limited to, Transmission Control Protocol/Internet Protocol ("TCP/IP"), HyperText Transfer Protocol ("HTTP"), and/or Session Initiation Protocol ("SIP").

In the foregoing discussion of FIG. 2, engines 202-214 were described as combinations of hardware and programming. Engines 202-214 may be implemented in a number of fashions. Looking at FIG. 3 the programming may be processor executable instructions stored on a tangible memory resource 330 and the hardware may include a processing resource 340 for executing those instructions. Thus, memory resource 330 can be said to store program instructions that when executed by processing resource 340 implement system 102 of FIG. 2.

Memory resource 330 represents generally any number of memory components capable of storing instructions that can be executed by processing resource 340. Memory resource 330 is non-transitory in the sense that it does not encompass a transitory signal but instead is made up of more or more memory components to store the relevant instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 102. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

In FIG. 3, the executable program instructions stored in memory resource 330 are depicted as identification module 302, notice module 304, component template module 306, dead content module 308, design rule test module 310, performance rule test module 312, and document analysis module 314. Identification module 302 represents program instructions that when executed by processing resource 340 may perform any of the functionalities described above in relation to identification engine 202 of FIG. 2. Notice module 304 represents program instructions that when executed by processing resource 340 may perform any of the functionalities described above in relation to notice engine 204 of FIG. 2. Component template module 306 represents program instructions that when executed by processing resource 340 may perform any of the functionalities described above in relation to component template engine 206 of FIG. 2. Dead content module 308 represents program instructions that when executed by processing resource 340 may perform any of the functionalities described above in relation to dead content engine 208 of FIG. 2. Design rule test module 310 represents program instructions that when executed by processing resource 340 may perform any of the functionalities described above in relation to design rule test engine 210 of FIG. 2. Performance rule test module 312 represents program instructions that when executed by processing resource 340 may perform any of the functionalities described above in relation to performance rule test engine 212 of FIG. 2. Document analysis module 314 represents program instructions that when executed by processing resource 340 may perform any of the functionalities described above in relation to document analysis engine 214 of FIG. 2.

Figure 4:
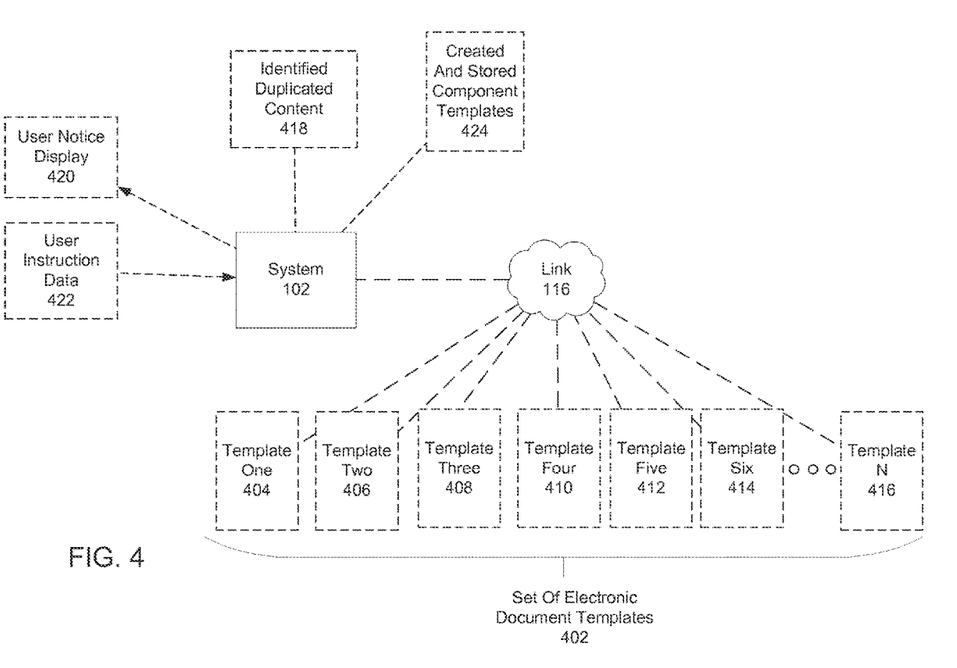
FIG. 4 illustrates an example of a system for creation of component templates.

Illustrative Example: FIG. 4, in view of FIGS. 1, and 2, illustrates an example of a system 102 for creation of component templates. In examples, system 102 may be hosted at a computing device such as server device 112 (FIG. 1) or distributed over a set of computing devices such as server system 114 (FIG. 1). In examples, system 102 may be included within a cloud server system that is electronically connected to a client computing device 404 via an internet or other network (link 116).

Figure 5:
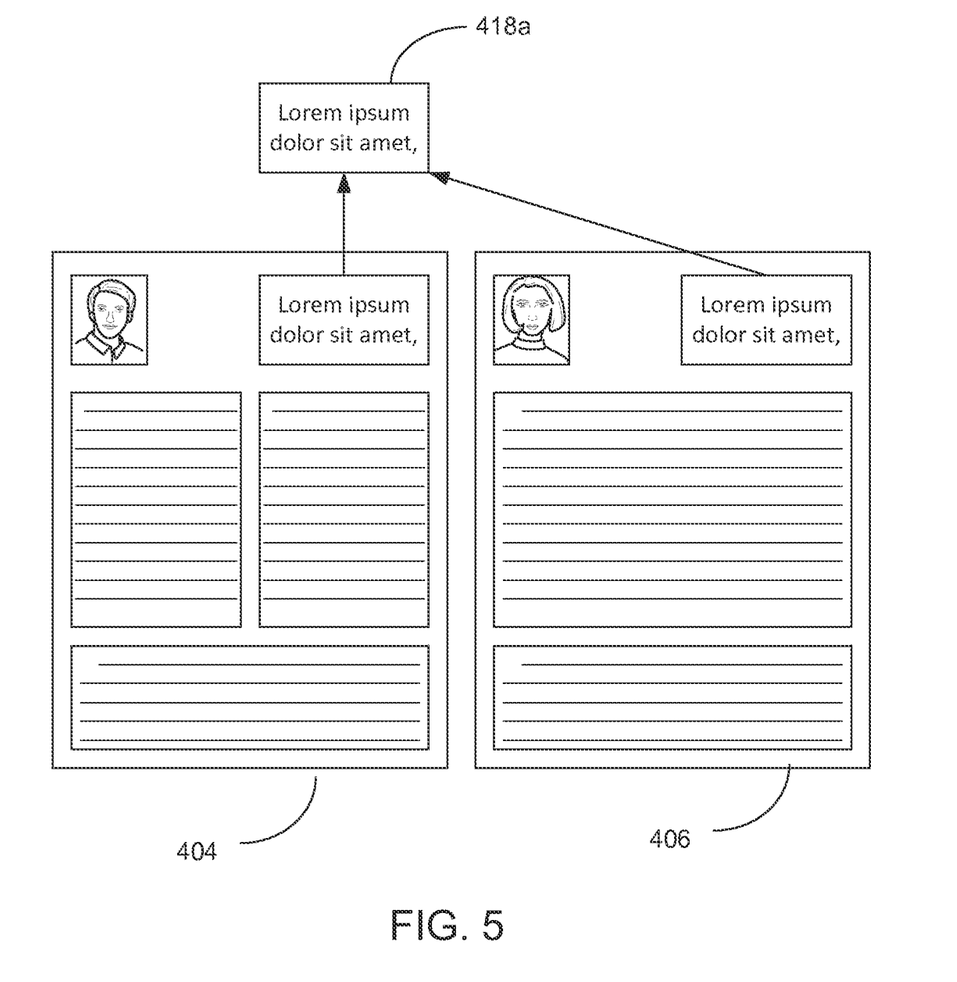
FIGS. 5-8 illustrate examples of component templates creation.
Figure 6:
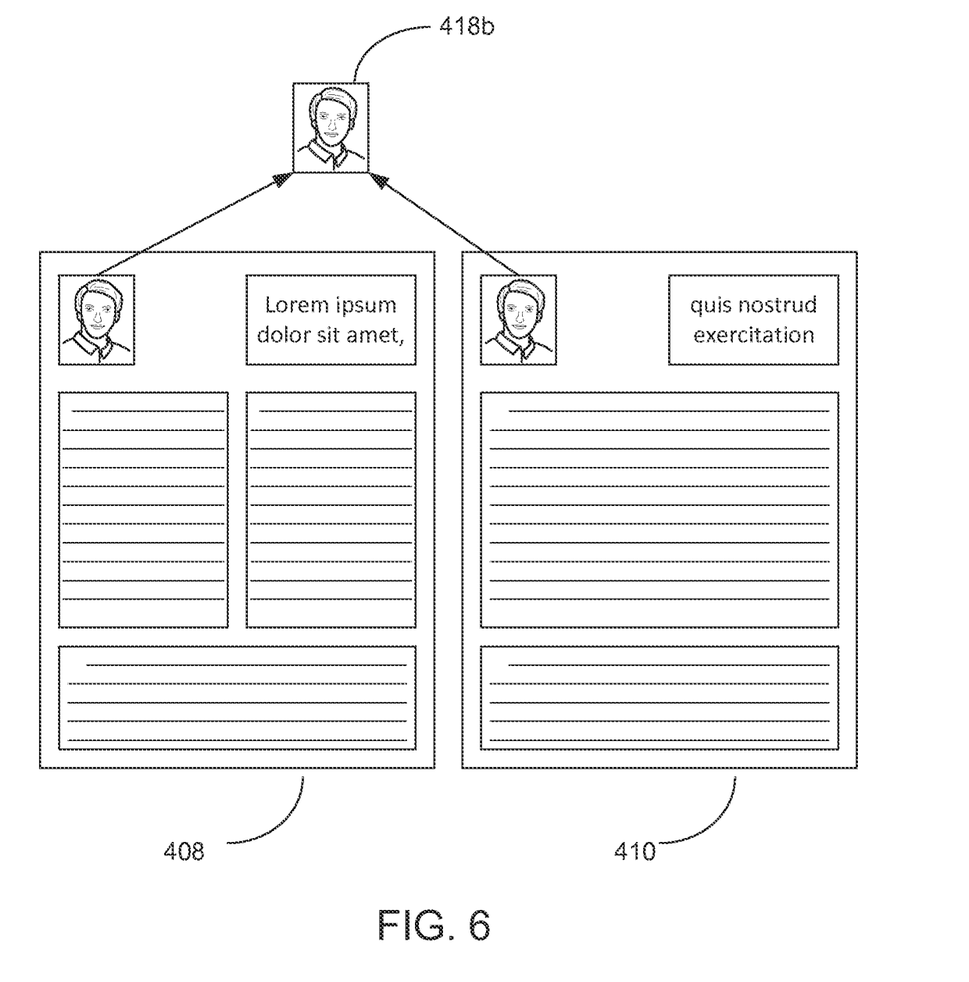
Figure 7:
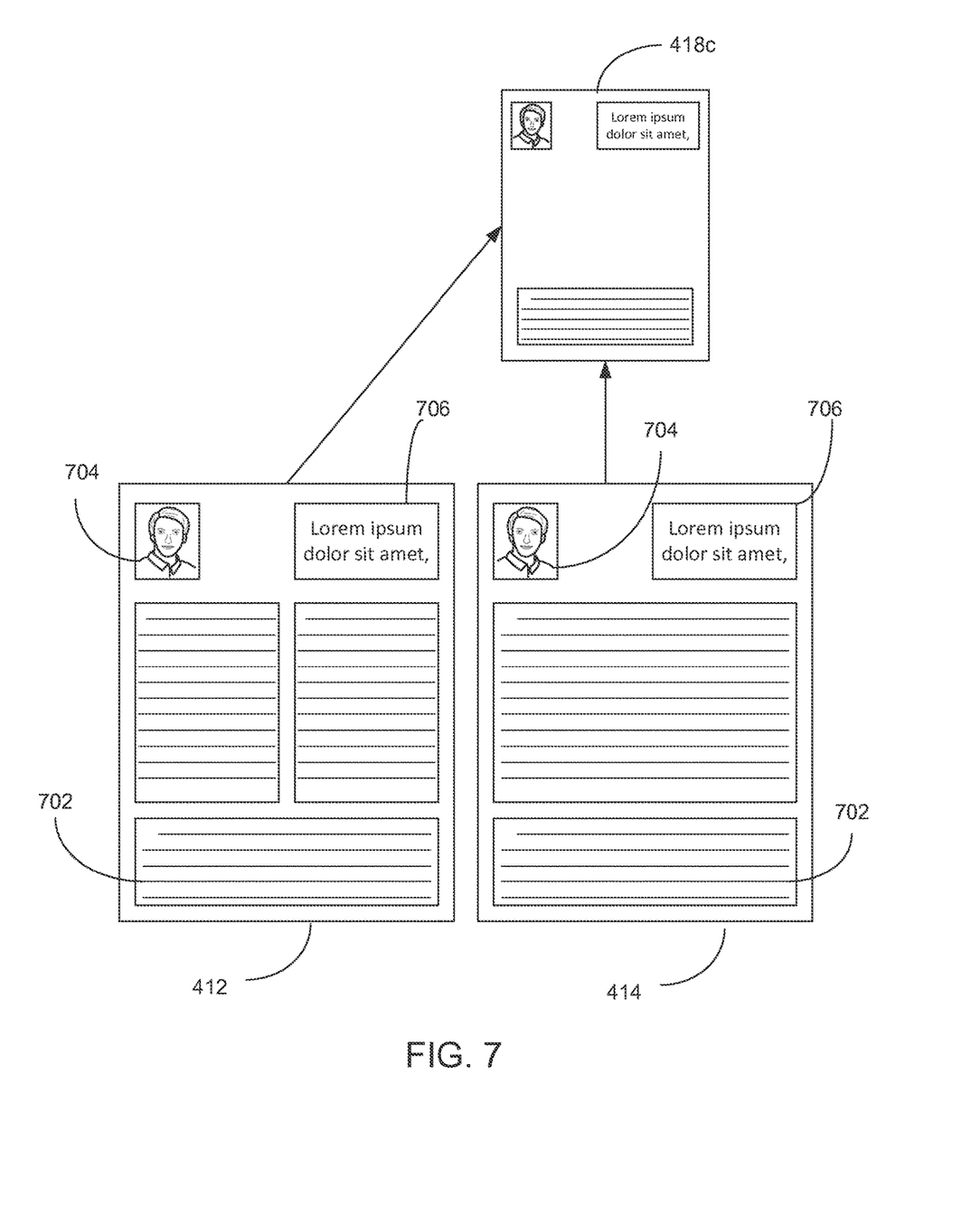

Starting at FIG. 4, in this example system 102 may access a set of electronic document templates 402, the set including Template One 404, Template Two 406, Template Three 408, Template Four 410, Template Five 412, Template Six 414, and Template N 416. In this example, the set of electronic document templates contains templates that vary according to geography, localization rules, etc. System 102 identifies instances of duplicated document content 418 among the electronic templates of the set 402. FIG. 5 provides an example wherein system 102 identifies duplicate document content that is duplicated text 418*a* in Template One 404 and Template Two 406 of the electronic template set 402. FIG. 6 provides an example wherein system 102 identifies duplicate document content that is a duplicated image 418*b* in Template Three 408 and Template Four 410 of the electronic template set 402. FIG. 7 provides an example wherein system 102 identifies duplicate document content that is a duplicated document structure 418c in Template Five 412 and Template Six 414 of the electronic template set 402. In the particular example of FIG. 7, the duplicate document structure is the common arrangement of a text paragraph 702, an image 704, and a header 706 as between Template Five 412 and Template Six 414.

Returning to FIG. 4, system 102 causes a display 420 of a user notice for the duplicated document content 418. In an example, the display 420 may be caused to occur at a display component that is included in or electronically connected to a client computing device, wherein the client computing device is electronically connected to system 102 via link 116. In this example, a user that views the display 420 of the user notice at the client computing device may interact with a user interface the device to formulate a user instruction to create a component template for the duplicated text content 418, and to cause the client computing device to send user instruction data 422 to system 102. Upon receipt of the user instruction data 422, system 102 creates and causes a storage of a component template 424 for the duplicated text content. In certain examples, system 102 may cause the created template 424 to be stored at a database.

Figure 8:
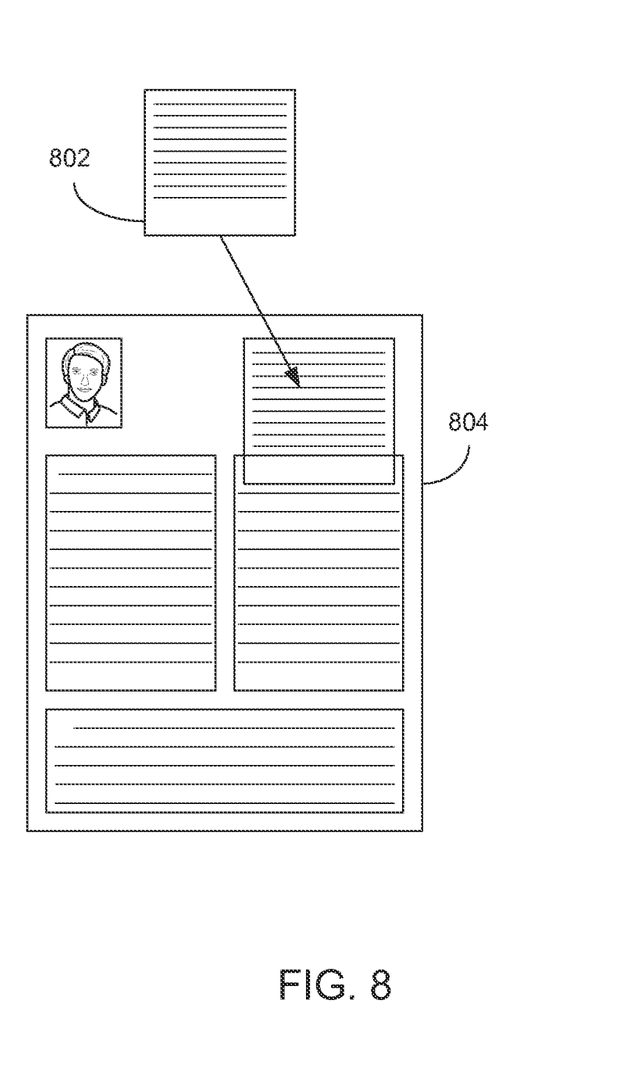

Moving to FIG. 8, system 102 may perform a performance rule test with respect to incorporation of a created first component template 802 into a second component template 804. System 102, responsive to determining that incorporation of the created first component template 802 into the second component template 804 will violate a design test rule, causes a user notice indicative of the design rule violation to be provided. In this case, system 102 accesses a database of component templates and inspects each template that uses the created first component to look for performance rule violations. In the example of FIG. 8, system 102 determines that the created first component is too large to fit on the page that is the second component template, and in turn sends a user notice of the performance rule violation to a client computing device.

Figure 9:
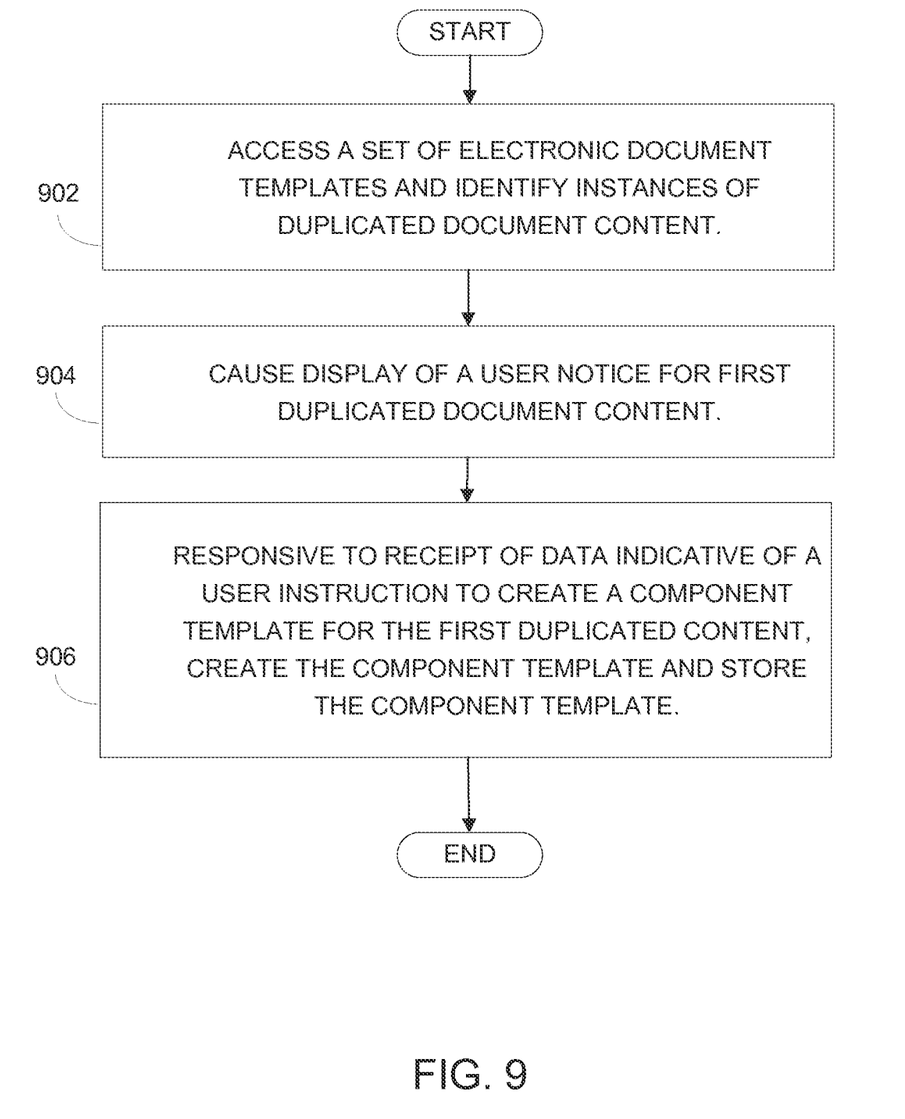
FIG. 9 is a flow diagram depicting implementation of an example of a method for creation of component templates.

Operation: FIG. 9 is a flow diagram of implementation of a method for creating component templates. In discussing FIG. 9, reference may be made to the components depicted in FIGS. 2 and 3. Such reference is made to provide contextual examples and not to limit the manner in which the method depicted by FIG. 9 may be implemented. A set of electronic document templates is accessed and instances of duplicated document content are identified (block 902). Referring back to FIGS. 2 and 3, identification engine 202 (FIG. 2) or identification module 302 (FIG. 3), when executed by processing resource 340, may be responsible for implementing block 902.

A user notice for first duplicated document content is caused to be displayed (block 904). Referring back to FIGS. 2 and 3, notice engine 204 (FIG. 2) or notice module 304 (FIG. 3), when executed by processing resource 340, may be responsible for implementing block 904.

Responsive to receipt of data indicative of a user instruction to create a component template for the first duplicated content, the component template is created and stored (block 906). Referring back to FIGS. 2 and 3, component template engine 206 (FIG. 2) or component template module 306 (FIG. 3), when executed by processing resource 340, may be responsible for implementing block 906.

Figure 10:
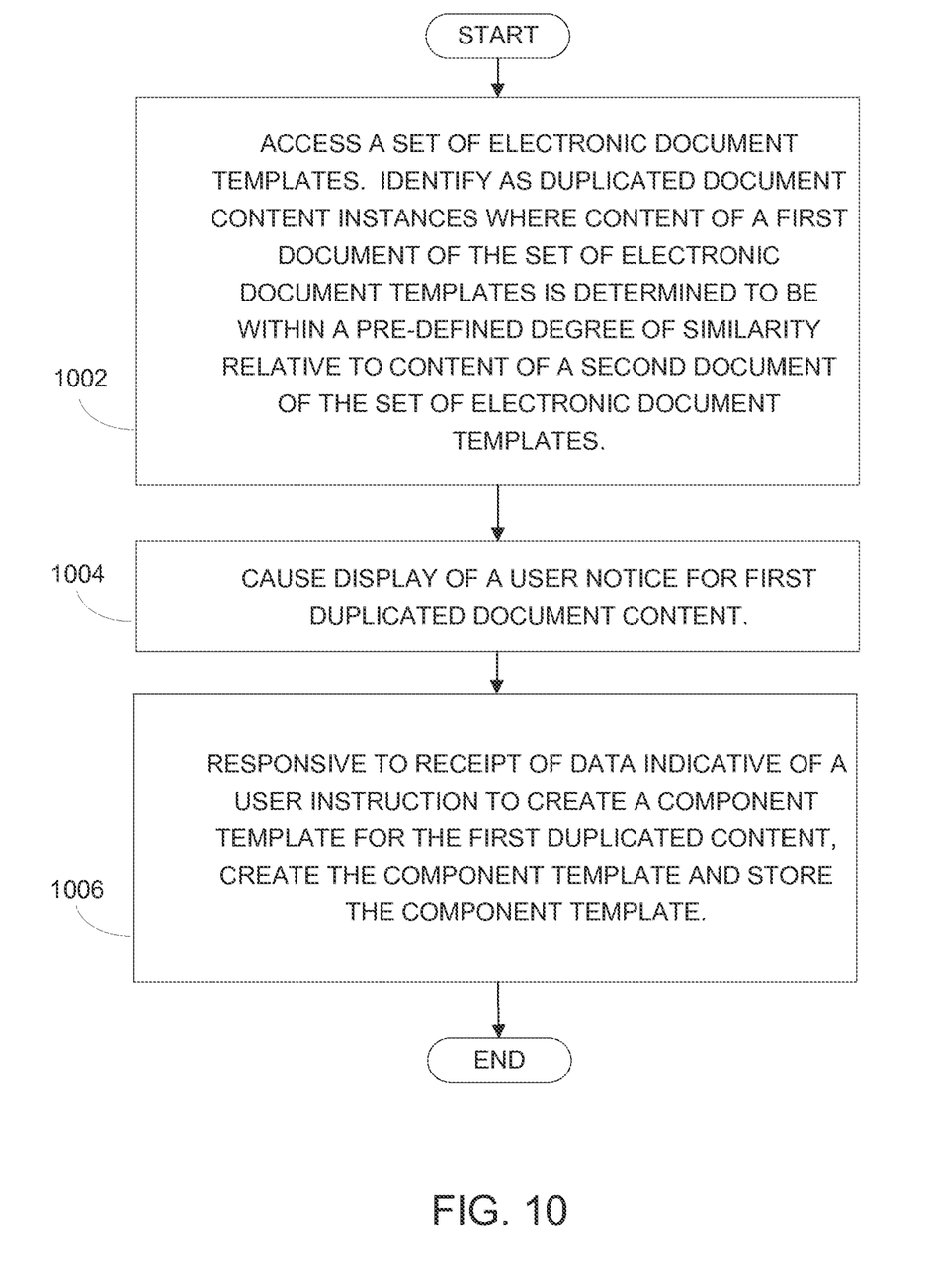
FIG. 10 is a flow diagram depicting implementation of an example of a method to create component templates, the method including identifying duplicated document content according to a pre-defined degree of similarity.

FIG. 10 is a flow diagram of implementation of a method for creating component templates, the method including identifying duplicated document content according to a pre-defined degree of similarity. In discussing FIG. 10, reference may be made to the components depicted in FIGS. 2 and 3. Such reference is made to provide contextual examples and not to limit the manner in which the method depicted by FIG. 10 may be implemented. A set of electronic document templates is accessed. Instances where content of a first document of the set of electronic document templates is determined to be within a pre-defined degree of similarity relative to content of a second document of the set of electronic document templates are identified as duplicated document content (block 1002). Referring back to FIGS. 2 and 3, identification engine 202 (FIG. 2) or identification module 302 (FIG. 3), when executed by processing resource 340, may be responsible for implementing block 1002.

A display of a user notice for first duplicated document content is caused (block 1004). Referring back to FIGS. 2 and 3, notice engine 204 (FIG. 2) or notice module 304 (FIG. 3), when executed by processing resource 340, may be responsible for implementing block 1004.

The component template is created and stored responsive to receipt of data indicative of a user instruction to create a component template for the first duplicated content (block 1006). Referring back to FIGS. 2 and 3, component template engine 206 (FIG. 2) or component template module 306 (FIG. 3), when executed by processing resource 340, may be responsible for implementing block 1006.

Figure 11:
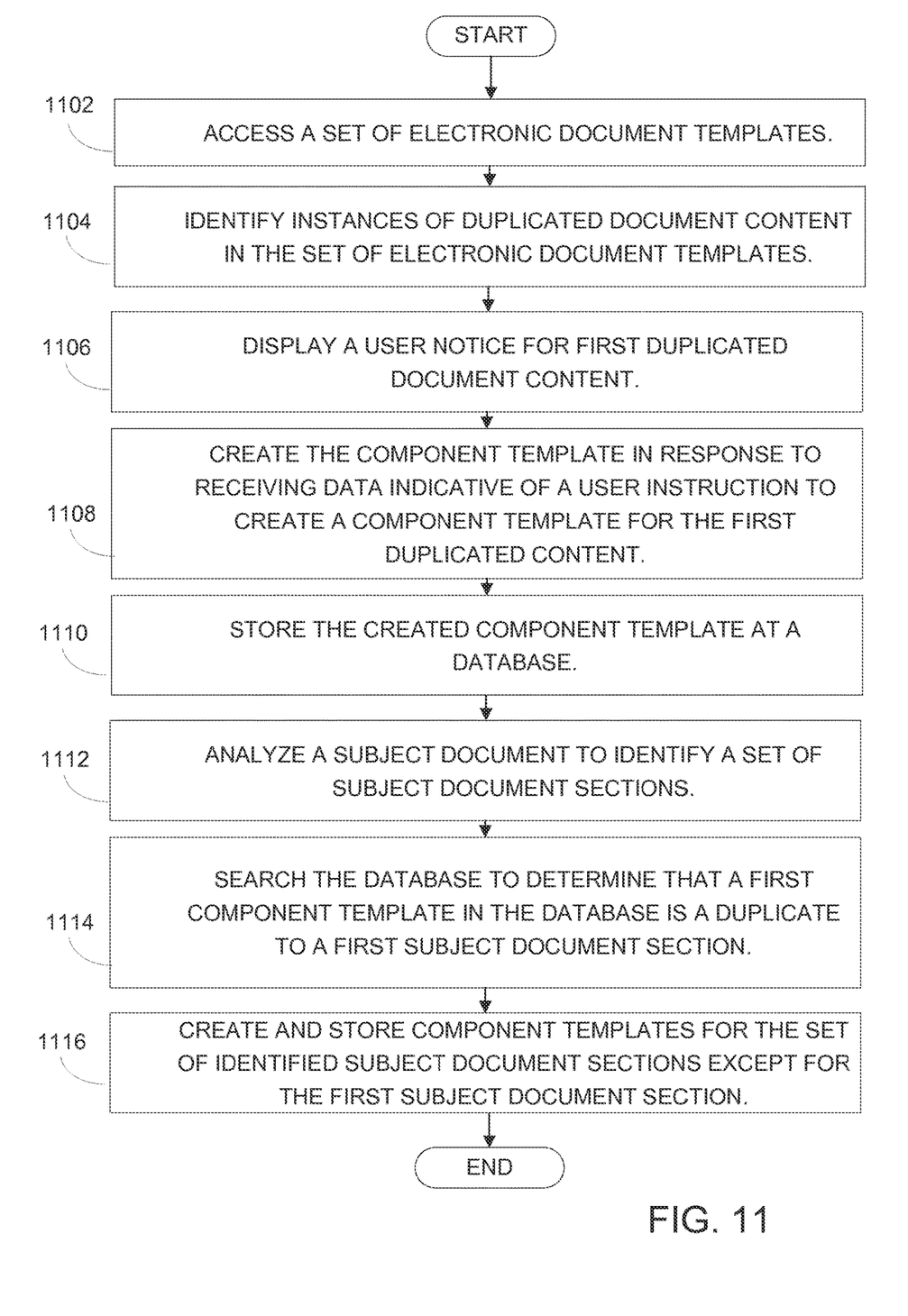
FIG. 11 is a flow diagram depicting implementation of an example of a method for creation of component templates, the method including analyzing a subject document to identify a set of subject document sections and creating and storing component templates for the set of identified subject document sections.

FIG. 11 is a flow diagram of implementation of a method for creation of component templates, the method including analyzing a subject document to identify a set of subject document sections and creating and storing component templates for the set of identified subject document sections. In discussing FIG. 11, reference may be made to the components depicted in FIGS. 2 and 3. Such reference is made to provide contextual examples and not to limit the manner in which the method depicted by FIG. 11 may be implemented. A set of electronic document templates is accessed (block 1102). Referring back to FIGS. 2 and 3, identification engine 202 (FIG. 2) or identification module 302 (FIG. 3), when executed by processing resource 340, may be responsible for implementing block 1102.

Instances of duplicated document content in the set of electronic document templates are identified (block 1104). Referring back to FIGS. 2 and 3, identification engine 202 (FIG. 2) or identification module 302 (FIG. 3), when executed by processing resource 340, may be responsible for implementing block 1104.

A user notice for first duplicated document content is displayed (block 1106). Referring back to FIGS. 2 and 3, notice engine 204 (FIG. 2) or notice module 304 (FIG. 3), when executed by processing resource 340, may be responsible for implementing block 1106.

The component template is created in response to receiving data indicative of a user instruction to create a component template for the first duplicated content (block 1108). Referring back to FIGS. 2 and 3, component template engine 206 (FIG. 2) or component template module 306 (FIG. 3), when executed by processing resource 340, may be responsible for implementing block 1108.

The created component template is stored at a database (block 1110). Referring back to FIGS. 2 and 3, component template engine 206 (FIG. 2) or component template module 306 (FIG. 3), when executed by processing resource 340, may be responsible for implementing block 1110.

A subject document is analyzed to identify a set of subject document sections (block 1112).

Referring back to FIGS. 2 and 3, document analysis engine 214 (FIG. 2) or document analysis module 314 (FIG.

3), when executed by processing resource 340, may be responsible for implementing block 1112.

The database is searched to determine that a first component template in the database is a duplicate to a first subject document section (block 1114). Referring back to FIGS. 2 and 3, document analysis engine 214 (FIG. 2) or document analysis module 314 (FIG. 3), when executed by processing resource 340, may be responsible for implementing block 1114.

Component templates for the set of identified subject document sections, except for the first subject document section, are created and stored (block 1116). Referring back to FIGS. 2 and 3, document analysis engine 214 (FIG. 2) or document analysis module 314 (FIG. 3), when executed by processing resource 340, may be responsible for implementing block 1116.

Conclusion: FIGS. 1-11 aid in depicting the architecture, functionality, and operation of various examples. In particular, FIGS. 1, 2, and 3 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electro-magnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 9-11 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive

What is claimed is:

1. A system for customer communication management, comprising:
    a processor;
    a data store storing a library of component templates; and
    a non-transitory computer readable medium, comprising instructions for:
        analyzing the component templates stored in the component template library, to identify first duplicative content based on first content included in a first content template as similar to second content in a second content template;
        determining if there is a third component template in the library of component templates associated with second duplicative content, the second duplicative content associated with the first duplicative content; and
        generating the third content template based on the second duplicative content when it is determined there is no third component template in the library of component templates.

2. The system of claim 1, wherein the first duplicative content is text, an image or a document structure.

3. The system of claim 1, wherein the identification of the duplicative content is based on per-defined degree of similarity.

4. The system of claim 1, wherein the instructions are further for: causing a user notice of the first duplicative content to be displayed to a user.

5. The system of claim 4, wherein the third content template is generated based on a user instruction to create the third content template.

6. The system of claim 5, wherein the second duplicative content is identified by the user.

7. The system of claim 6, wherein the first duplicative content is the same as the second duplicative content.

8. A method, comprising:
    analyzing the component templates stored in a component template library, to identify first duplicative content based on first content included in a first content template as similar to second content in a second content template;
    determining if there is a third component template in the library of component templates associated with second duplicative content, the second duplicative content associated with the first duplicative content; and
    generating the third content template based on the second duplicative content when it is determined there is no third component template in the library of component templates.

9. The method of claim 8, wherein the first duplicative content is text, an image or a document structure.

10. The method of claim 8, wherein the identification of the duplicative content is based on per-defined degree of similarity.

11. The method of claim 8, further comprising causing a user notice of the first duplicative content to be displayed to a user.

12. The method of claim 11, wherein the third content template is generated based on a user instruction to create the third content template.

13. The method of claim 12, wherein the second duplicative content is identified by the user.

14. The method of claim 13, wherein the first duplicative content is the same as the second duplicative content.

15. A non-transitory computer readable medium, comprising instructions for:
- analyzing the component templates stored in a component template library, to identify first duplicative content based on first content included in a first content template as similar to second content in a second content template;
- determining if there is a third component template in the library of component templates associated with second duplicative content, the second duplicative content associated with the first duplicative content; and
- generating the third content template based on the second duplicative content when it is determined there is no third component template in the library of component templates.

16. The non-transitory computer readable medium of claim 15, wherein the first duplicative content is text, an image or a document structure.

17. The non-transitory computer readable medium of claim 15, wherein the identification of the duplicative content is based on per-defined degree of similarity.

18. The non-transitory computer readable medium of claim 15, further comprising instructions for causing a user notice of the first duplicative content to be displayed to a user.

19. The non-transitory computer readable medium of claim 18, wherein the third content template is generated based on a user instruction to create the third content template.

20. The non-transitory computer readable medium of claim 19, wherein the second duplicative content is identified by the user.

21. The non-transitory computer readable medium of claim 20, wherein the first duplicative content is the same as the second duplicative content.

* * * * *